Aug. 26, 1958  D. S. VERNON  2,848,751
METHOD FOR MAKING INDEX TIPS
Filed Jan. 12, 1953
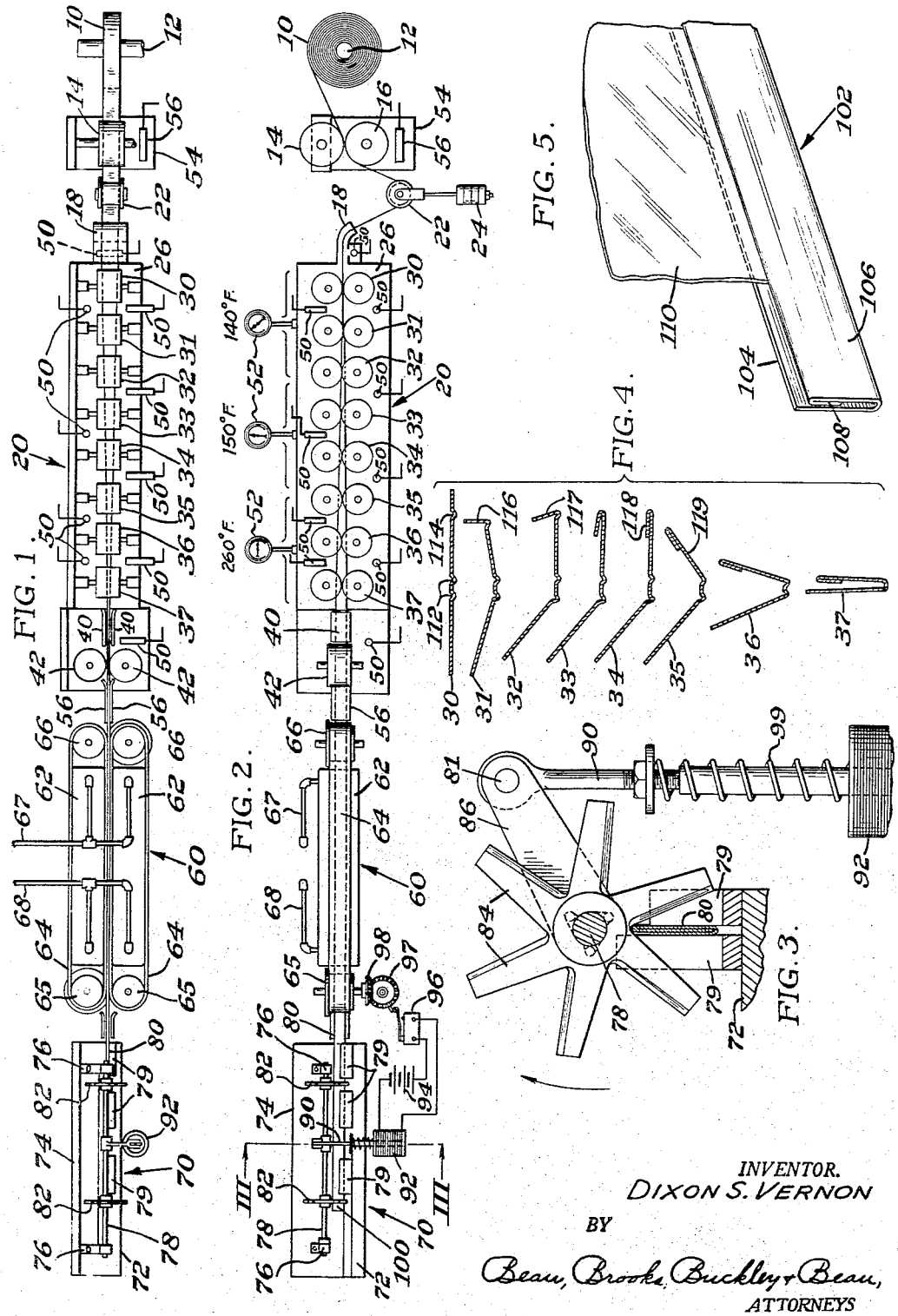
INVENTOR.
DIXON S. VERNON
BY
Beau, Brooks, Buckley + Beau,
ATTORNEYS

United States Patent Office 2,848,751
Patented Aug. 26, 1958

2,848,751

METHOD FOR MAKING INDEX TIPS

Dixon S. Vernon, Jamestown, N. Y., assignor to Art Metal Construction Company, Jamestown, N. Y.

Application January 12, 1953, Serial No. 330,770

4 Claims. (Cl. 18—56)

This invention relates to an improved method for making index tips of the type comprising transparent protective sheaths for receiving index slips in slide-fitted relation therein. More particularly, the invention relates to mass production of the aforesaid devices by means of a machine into which is fed continuously a flat strip or ribbon of thermoplastic stock material; the flat stock material being then interfolded and reflattened and cut into appropriate lengths by the machine, for the purposes aforesaid.

Whereas, for example for the purposes aforesaid machines have been previously devised which involve extruding or pressure-sliding flat stock strips through "drawing" dies or the like, such devices have been found to subject the stock material to undesirable stresses and abuse and to embody certain other objections and disadvantages. Therefore, it is a primary object of the present invention to provide a new and improved method for mass-producing index protective covers and the like, whereby the stock material is subjected to no abusive stresses and is undamaged incidental to the thermoplastic reforming thereof.

Other objects and advantages of the invention will appear from the specification hereinafter.

In the drawing:

Fig. 1 is a schematic top plan view of a machine of the invention;

Fig. 2 is a schematic side elevational view thereof;

Fig. 3 is a fragmentary section, on an enlarged scale, taken along line III—III of Fig. 2;

Fig. 4 shows compositely and in productive sequence, typical sectional forms which the stock strip assumes as it progresses through the machine of the invention; and Fig. 5 is a fragmentary perspective view of a section of an index casing product of the invention, illustrating the method of use thereof.

The invention generally contemplates provision of a machine adapted to receive in continuously feeding form a flat strip of thermoplastic material such as Celluloid, cellulose acetate, or other suitably transparent material such as may be desired for the index slip covering product. Thus, for example, as shown in Figs. 1 and 2, the strip stock material may be supplied in wound form upon a spool as indicated at 10; the spool being indicated at 12 as being adapted to be supported in suitable bearings so that the reel is free to rotate as the strip material is drawn therefrom. The stock strip 10 is preferably drawn off the spool by means of a pair of nip rolls as indicated at 14—16, one or both of which are power driven by any suitable source (not shown) and suitably speed-synchronized with the travel of the stock strip through the machine, as will be explained hereinafter. Optionally, the stock strip may be roughened or abraded at one or both surfaces thereof if desired at this stage of the operation, so that the finished article will be of surface-roughened form and thereby adapted to receive pencil or ink markings thereon for index purposes. In such case, one or both of the rolls 14—16 may be sandblasted or otherwise roughened, and preferably heated as by means of suitable electric resistance heating elements or steam conveying ducts within the roller shafts. Thus, as the stock strip passes through the rolls 14—16 it receives a surfacing impression therefrom which destroys the slippery-surfaced effect usually characteristic of Celluloid or cellulose acetate materials or the like.

As the stock strip emerges from the nip rolls 14—16 it travels through a feed guide 18 which directs it into the fold-forming portion of the machine as is designated generally by the numeral 20. An idler pulley 22 is preferably hung upon the stock strip between the positions of the nip rolls 14—16 and guide 18, and is suitably weighted as indicated at 24 (Fig. 2). Thus, a loop of excess strand material is provided between the nip rolls 14—16 and the fold-forming mechanism of the unit 20 to accommodate unequal speeds of operation thereof.

The fold-forming portion 20 of the machine comprises generally a housing 26 within which are mounted a series of paired forming rolls as indicated at 30, 31, 32, 33, 34, 35, 36, 37. The rolls of each unit are peripherally shaped to complementary forms so that as the flat stock strip progresses through the roll units it is successively deformed into the sectional shapes as indicated in Fig. 4 at 30, 31, 32, 33, 34, 35, 36, 37 respectively; it being understood that each pair of rolls comprises an upper and lower roll, the peripheral surfaces of which "mate" to press the stock strip progressively into the sectional forms shown in Fig. 4. Thus, whereas the stock strip enters the right hand end portion of the unit 20 in horizontally disposed and flat strip form, as it progresses through the roll units it is first scored as shown at 30 in Fig. 4, and then edge-folded at one edge thereof as shown at 31. Then, as indicated at 32—37 the opposide edges are progressively folded upwardly and inwardly until, as the stock strip emerges from the last roll unit 37, it has been pressed into the sectional form thereof shown at 37 in Fig. 4 and is disposed in upright standing attitude. Thus, it readily threads through a pair of vertically parallel guide plates 40—40 disposed at the left hand portion of the unit 20. These guide plates direct the folded strip to pass between the pair of pressure rolls 42—42 which operate to complete the closing of the folded strip form, as into the sectional form thereof shown in Fig. 5, for example.

To facilitate the above described sectional shaping and strip folding operation, and to avoid damaging stresses on the stock strip material, the housing 26 is heated to progressively higher degrees commencing at the inlet end portion thereof. Thus, for example, as indicated at 50 (Figs. 1–2) electrical heating elements are mounted within the housing adjacent the bearing supports for the forming roll units thereof so as to cause the stock strip to be heated to progressively higher degrees as it travels from right to left through the unit as shown in the drawing. Suitable thermostat control devices (not shown) for the heating elements are preferably provided, and thermometer devices such as indicated at 52 (Fig. 2) are preferably mounted on the housing 26 to enable the machine attendant to check the temperatures within the housing.

The requisite temperatures at the different stages of the folding operation will of course depend upon the nature of the stock strip material and the speed of travel thereof through the machine; and as illustrated for example at Fig. 2 of the drawing the temperatures may range from 140° to 260° F. Thus, the stock strip is heated relatively slightly as it first enters the machine while it is undergoing relatively slight sectional deformation; and it receives its maximum heat treatment while it is undergoing more severe folding. Similarly, to facilitate the surface roughening operation as the stock strip passes through the rolls 14—16, the latter may be advantageously enclosed within a housing as indicated at 54 within which is mounted a heating unit as indicated at 56, so that the rolls 14—16 will be heated and thereby aided in the operation of leaving impressions on the surfaces of the stock strip.

Adjacent the exit end portion of the forming unit 20, the flat-surfaced pressing rolls 42—42 apply to the previously folded stock strip a final flat pressing operation, and from thence the folded strip is delivered through guide plates 56—56 into a cooling unit designated generally at 60. The unit 60 comprises a pair of elongated guide blocks 62—62 which are disposed in parallel spaced relation so as to provide therebetween a channel of sufficient width to accommodate the folded stock strip while being enclosed between a pair of endless tapes 64—64 which train around corresponding paired pulleys 65—66. The tapes 64—64 may be conveniently formed of sheet steel material or the like and coact to press therebetween the folded stock strip and to hold it in its folded form while it travels through the unit 60. The blocks 62—62 are hollowed and provided with cold water inlet and outlet conduit connections as indicated at 67—68, whereby the tapes 64—64 are kept cool and thereby operate to cool down the folded stock strip while holding it in folded form.

The stock strip is then delivered to a cut-off mechanism as is designated generally at 70. This device is illustrated to comprise a base or frame portion 72 having an upstanding rear wall portion 74 upon which is mounted bearings 76—76 supporting a cutter shaft 78 aligned parallel to and above the position of the stock strip as it passes from the cooling unit 60 into the cutting unit 70. The base plate portion 72 mounts guide blocks 79 which receive and support the folded stock piece in longitudinally slide fitting relation therein as indicated at 80 (Fig. 3). A pair of cutting spiders as indicated at 82 are carried by the shaft 78 and arranged to be longitudinally adjustable thereon and detachably fixed thereto as by any suitable set screw means or the like, whereby the distance between the cutting wheels may be varied to suit any required length for the finished product. As shown in Fig. 3, the cutting spiders may be provided with any desired number of cutting blades 84 extending radially therefrom, and the support blocks 79 are disposed adjacent the cutting spiders 82—82 so as to properly hold the stock strip 80 in firm position while the cutting spiders operate thereon.

To actuate the cutting mechanism, a crank arm is arranged to extend from the cutter shaft 78 as indicated at 86; the crank arm being pivotally connected as indicated at 87 to the movable rod member 90 of a solenoid mechanism as indicated at 92. The solenoid 92 is arranged to be powered by any suitable power source as indicated at 94 (Fig. 2) and is controlled by means of a spring-switch 96 which in turn is actuated by a cam wheel 97 driven in synchronism with the machine motion, as by a gear mechanism 98 operatively connected to the power shaft portion of one of the endless tape pulleys 65 to which the machine power is applied for pulling the stock strip through the cooler mechanism. The roller die units 30—37 may also be conveniently geared to the same power source, as well as the impression roll unit 14—16. The cam 97 is so constructed and arranged that coincident with each revolution thereof the switch 96 will be actuated to cause energization of the solenoid whereby the latter will pull down upon the crank arm 86 against the action of a compression spring 99 (Fig. 3), thereby rotating the cutter shaft 78 to cause the knife blades to rotate sufficiently to cut off, at both ends, a finisehd index tip strip of the desired length. The gearing as indicated at cam wheel 97 and gear 98 is preferably so selected as to permit slightly more than the prescribed length of stock strip to feed into the cut-off mechanism intermediately of each operation thereof so that a small excess piece of stock material is severed simultaneously from the outer end of the stock strip, as indicated at 100 (Fig. 2). This insures that the product strips will all be uniformly of the prescribed length. As these strips are cut they fall into any suitable product collection bin (not shown). When it is desired to change the lengths of the product strips the cutting spiders 82—82 are suitably shifted on the shaft 78 and the cam wheel 97 and gear 98 is changed accordingly.

Fig. 5 illustrates use of the product of the invention, wherein the product strip is shown fragmentarily and is designated generally by the numeral 102. The strip comprises a bent folded Celluloid piece comprising a back wall 104, a forward wall 106, and a downturned inwardly bent inner wall 108. An index divider card to which the index strip 102 is attached is shown fragmentarily at 110, it being appreciated that the index strip may be attached to the card 110 by stapling or adhesive or any other suitable means, and that the index strip is then ready to receive an index slip in slide-fitted form from one end thereof, so that the indicia on the index slip is readily viewable from exteriorly thereof.

It is a particular feature of the method and machine of the present invention that the relatively fragile stock strip piece is subjected to no undue stress or abuse during the operation of thermo-plastic folding thereof, while at the same time the machine operates continuously and at relatively high-speed. Hence, the finished articles are mass-produced relatively inexpensively and in more perfect form. This result is obtained because of the mode of progressive folding of the stock strip as it passes through the roller dies at stations 30–37 inclusive. For example as illustrated in Fig. 4, as the stock strip passes through the first roller die unit 30 it is impressed thereby into the longitudinally beaded form as indicated at 112—114. Then as the stock strip passes through the next roller die unit 31, the latter operates upon the stock strip to initiate upward folding of the outside flange portions, as indicated at 31—116. Then, as the stock strip further progresses through the roller die units 32—37 successively, the opposite side portions of the strip are folded progressively further upwardly and then inwardly as shown at 32—37 and at 117—119, until finally the stock strip is provided in the form shown at 37 wherein the strip is now in substantially U-shaped sectional form with one upper edge portion folded inwardly and downwardly to provide the folded flange portion designated 108 in Fig. 5. The preliminary scoring or beading of the stock strip as indicated at 112—114 which takes place at the roller die unit 30, facilitates the above described folding and infolding operation because the bead formations serve as guide fulcrums for the folding actions; thereby providing a precisely dimensioned product at all times. Also, the beads 112—114 operate to so control the folding stresses throughout the balance of the thermo-plastic forming operations, that fracturing of the stock strip material is thereby avoided.

Thus, it will be appreciated that the machine and method of the invention provides a relatively inexpensive means for rapidly and continuously mass-producing the designated products in improved finished form, as distinguished from prior art methods employing for example intermittently actuated dies or the like. Also, it will be appreciated of course, that whereas only one embodiment of the invention has been illustrated and described in detail herein, various changes may be made therein without departing from the spirit of the invention or the scope of the appended claims.

I claim:

1. A method of making index covers from flat strip stock of thermoplastic material comprising passing the stock through a series of heated mating roller die units arranged to form longitudinal beads serving as guide fulcrums and to perform successive folding operations upon the longitudinal beads of the cover-forming stock strip to progressively fold the latter from flat stock form into lengthwise folded form having substantially sharp folds, progressively increasing the temperature of the stock strip at each successive forming die units wherein the temperature of the strip is lowest where the folding stress on the longitudinal beads is least and is highest where the folding stress on the longitudinal beads is greatest, and maintaining the folded condition of the strip by holding and pressing the strip during the cooling thereof to set the folds.

2. The method as defined in claim 1 wherein the lowest temperature at the first die unit is approximately 140° F. and the highest temperature at the last die unit is approximately 260° F.

3. The method as defined in claim 1 wherein there is a preliminary step of heating and roughening the strip before it is acted upon by the successive pairs of die units.

4. The method as defined in claim 1 wherein there is an additional step of cutting the cooled and set folded strip into prescribed lengths.

References Cited in the file of this patent

UNITED STATES PATENTS

| | | |
|---|---|---|
| 1,738,334 | Taber | Dec. 3, 1929 |
| 1,978,868 | Smith et al. | Oct. 30, 1934 |
| 2,279,901 | Domizi | Aug. 14, 1942 |
| 2,323,862 | Zimmerman et al. | July 6, 1943 |
| 2,373,093 | Baker | Apr. 10, 1945 |
| 2,383,896 | Taber | Aug. 28, 1945 |
| 2,518,806 | Muench | Aug. 15, 1950 |
| 2,589,022 | Page et al. | Mar. 11, 1952 |
| 2,620,513 | Cryor | Dec. 9, 1952 |